Figure 5:
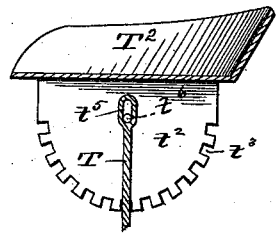
Figure 6:
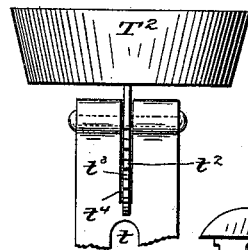

(No Model.)  2 Sheets—Sheet 1.
B. NUNAMACKER.
CORN PLANTER.
No. 329,203. Patented Oct. 27, 1885.
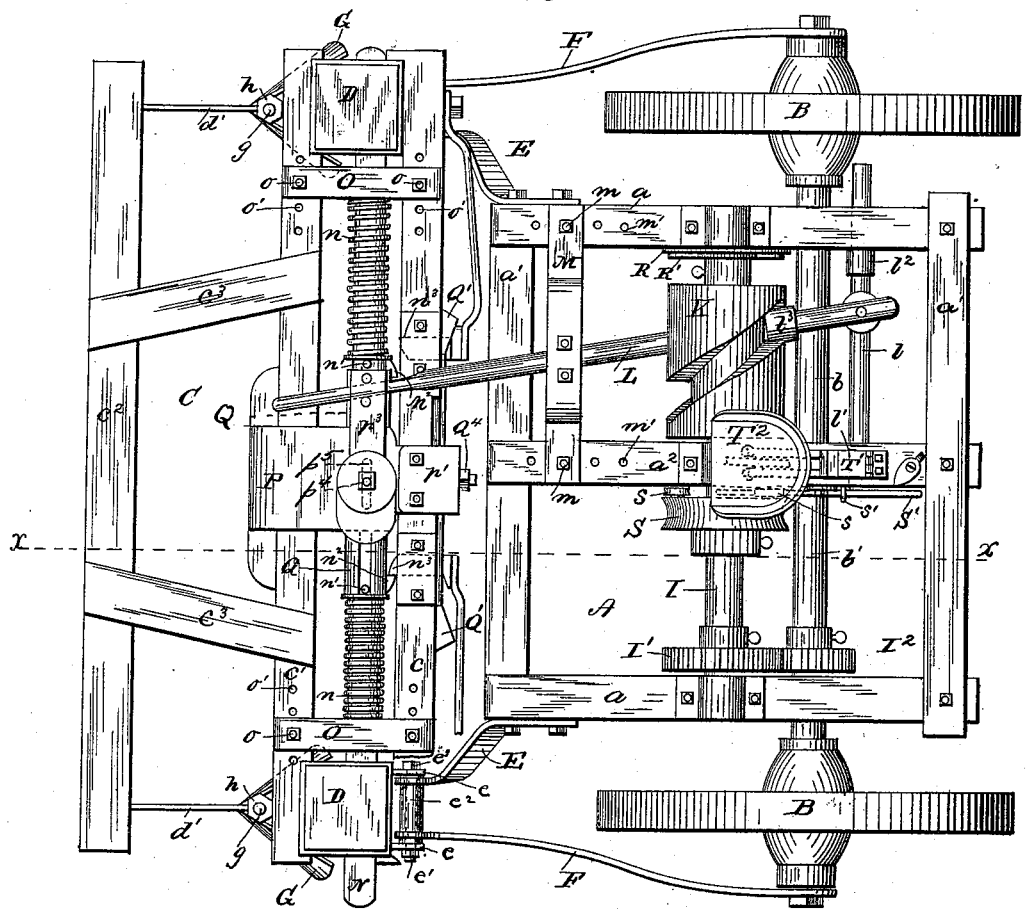
Fig. 1.
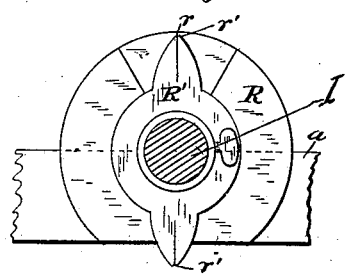
Fig. 3.
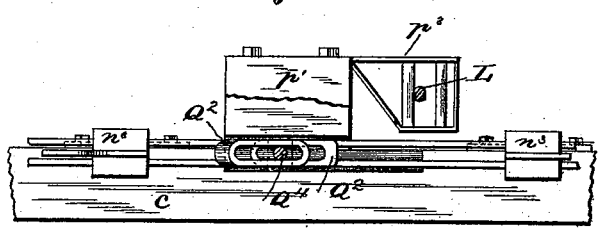
Fig. 4.
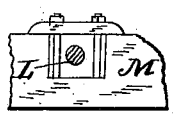
WITNESSES
Chas. R. Burr
James M. Durant
INVENTOR
B. Nunamacker
by Franck D. Johns
Attorney (No Model.) 2 Sheets—Sheet 2.

B. NUNAMACKER.
CORN PLANTER.

No. 329,203. Patented Oct. 27, 1885.

WITNESSES
Chas. R. Burr
James M. Durant

INVENTOR
B. Nunamacker
by Franck D. Johns
Attorney

United States Patent Office.

BY NUNAMACKER, OF DE SOTO, ASSIGNOR TO JOHN R. THOMSON, OF EARLHAM, IOWA.

CORN-PLANTER.

SPECIFICATION forming part of Letters Patent No. 329,203, dated October 27, 1885.

Application filed February 16, 1885. Serial No. 156,052. (No model.)

*To all whom it may concern:*

Be it known that I, BY NUNAMACKER, a citizen of the United States, residing at De Soto, in the county of Dallas and State of Iowa, have invented certain new and useful Improvements in Corn-Planters; and I do hereby declare the following to be a full, clear, and exact description of the invention, such as will enable others skilled in the art to which it appertains to make and use the same.

My invention relates to certain improvements in that class of corn-planters which are provided with a main frame supported upon suitable wheels and carrying the driving mechanism, and a forward frame hinged to the main frame and carrying the seed-dropping devices.

In all planters of this class that have heretofore been in use, when the forward frame would adapt itself to the inequalities of the ground—as, for instance, when the tongue would be raised in going up a slight hill, while the wheels were still on the downgrade—the lower end or foot of the seed-tubes would be farther from the vertical center of the wheels than when on level ground. This is a serious objection, as it causes the seed to be dropped at irregular distances, and thus puts the planter out of check.

The object of my invention is to overcome this difficulty; also, to provide a register or gage by which the operator can tell the moment the machine is out of check.

It has for a further object to provide clearing or gage flanges for the runners, by which the depth of planting can be regulated; and, further, to provide seed-dropping valves which will be quickly opened and closed at each stroke of the slide-bar, thus depositing the seed in one place, and not distributing it between the hills.

My invention consists, essentially, of a main frame supported upon suitable wheels and carrying the driving mechanism, a forward frame carrying the seed-dropping devices and hinged at its lower part or foot to the main frame, a register or gage adapted to indicate when the planter is out of check, adjustable clearing and gage flanges fitting on each side of the runners and regulating the depth of planting, a reciprocating slide-bar actuated by independent springs, a compressor adapted to alternately compress the springs, and means for automatically holding and releasing said springs as the compressor is actuated, and thus alternately project the slide-bar in opposite directions, and in certain other novel construction and arrangement of the various parts, all of which I will now proceed to point out and describe, reference being had to the accompanying drawings, in which—

Figure 2:
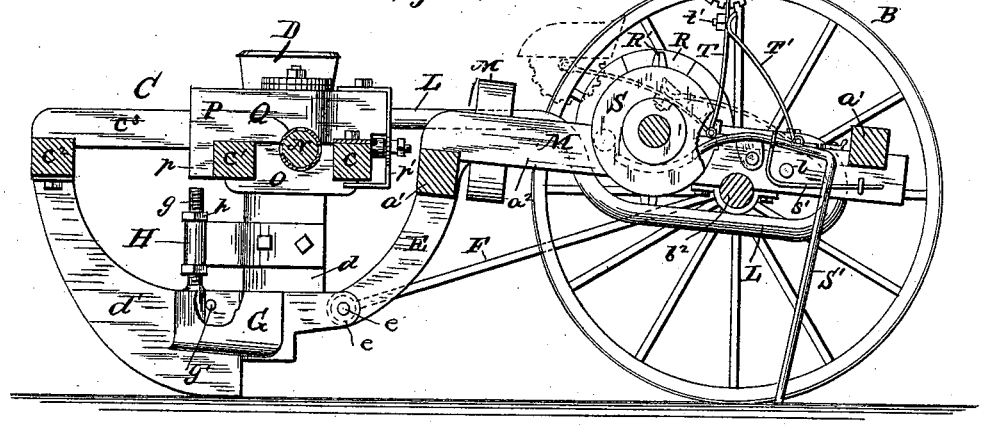
Figure 7:
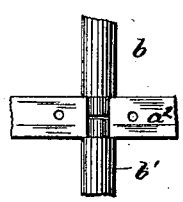
Figure 9:
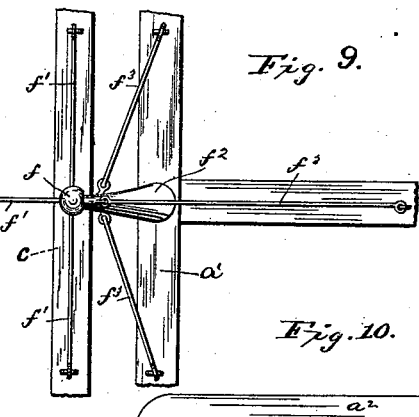
Figure 8:
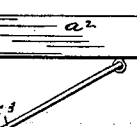
Figure 10:
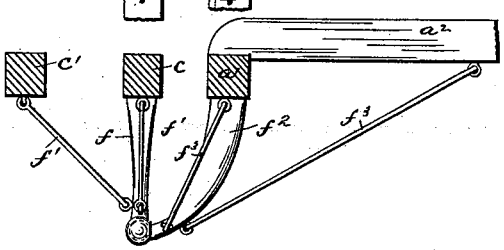

Figure 1 is a top plan view of a corn-planter embodying my improvements; Fig. 2, a vertical longitudinal section taken on line $x\ x$ of Fig. 1. Figs. 3, 4, 5, 6, 7, and 8 are details showing various parts of the machine, and Figs. 9 and 10 are details showing a modification of the devices for connecting the forward and main frame.

Referring to said drawings, A is the main frame, consisting of the side bars, $a\ a$, cross-bars $a'\ a'$, and center bar, $a^2$. The axle on which are mounted the wheels B B is formed in two sections, $b\ b'$. Said axle is mounted in bearings on the under side of the side bars, $a\ a$, and center bar, $a^2$. This construction allows either wheel to be rotated independently, and is a great advantage in turning the planter.

C is the forward frame, carrying the seed-dropping mechanism, hereinafter described. Said frame is composed of the parallel bars $c$, $c'$, and $c^2$ and braces $c^3$. To the bar $c^2$ the tongue is secured in any suitable manner.

At each end of and secured between the bars $c\ c'$ are seed-hoppers D D. $d\ d$ are dependent seed-tubes, preferably made triangular in cross-section. $d'\ d'$ are runners or furrow-openers, secured at their lower ends to the foot of the seed-tubes, and fastened at their upper ends to the bar $c^2$.

E E are connecting-rods, their upper ends being rigidly secured to the main frame, their lower ends being hinged to the foot of said seed-tubes. In the construction shown, on the foot of each seed-tube I form bearings $e$, in which are mounted bolts $e'$, surrounded by sleeves $e^2$, to which the connecting-rods are secured; but any well-known form of hinge may be used, if preferred.

F F are rods secured on the outside of the wheels to the ends of the axle. Said rods extend down to the foot of the seed-tubes, and are secured to the sleeve $e^2$. It will be readily seen that by connecting the main and forward frames of the planter by the means above described the forward frame will be permitted to adapt itself to the inequalities of the ground, but at the same time the lower ends of the seed-tubes are always the same distance from the vertical center of the wheels supporting the main frame, thus causing the seed to be dropped at regular distances.

In Figs. 9 and 10 I show a modification of the means for connecting the two frames. It consists of an upright rod, $f$, secured to the center of the bar $c$ of the forward frame, and suitably braced to said frame by the braces $f'$. An inclined rod, $f^2$, is rigidly secured at its upper end to the main frame, and is strengthened by braces $f^3$. The two rods are hinged to each other by a ball-and-socket joint on their lower ends, as shown, or by any other preferred form of universal joint. By this construction I secure the same results as in the form of connection first described, and at the same time permit the forward frame to be moved slightly from side to side, and thus render it much easier to turn the planter.

G G are vertically-adjustable clearing and gaging flanges secured to bifurcated rods $g\ g$, fitting snugly over the runners, their rear sides bearing against the pins $g'$, projecting on both sides of the runners. The upper ends of the rods $g\ g$ are screw-threaded, and pass up through vertical tubular bearings H H, secured to the seed-tubes above the runners. $h\ h$ are nuts by means of which the runners are adjusted. By moving the adjustable flanges toward or from the bottom of the runner the depth of planting is regulated.

I is a shaft mounted in bearings on the bars $a$ and $a^2$.

I' is a gear-wheel mounted on the shaft I, and gearing with a gear-wheel, I², on the section $b'$ of the axle. When the axle turns, motion is imparted to the wheels I' I² and shaft I. Any suitable device can be used for throwing the gear-wheels in or out of gear; but it is not described, as it forms no part of my invention.

K is a grooved cam-wheel mounted on the shaft I.

L is a lever having its forward end connected with the seed-dropping devices, as hereinafter described. Said lever extends back and is bent under the cam-wheel K, its rear end being pivoted to and supported by the reciprocating rod $l$, which works in bearings $l'\ l^2$. The bearing $l^2$ extends in toward the center of the main frame. This allows the outer end of the rod $l$ to be shortened, so that it will not interfere with the wheel as said rod is reciprocated. The lever L is fulcrumed in a vertical slot in the adjustable fulcrum-bar M. Said bar M is secured to the bars $a\ a^2$ by pins or bolts $m$ which enter bolt-holes $m'$ in the bars $a\ a^2$. By moving the fulcrum-bar forward or backward on the bars $a\ a^2$ the leverage can be changed, and thus regulate the stroke of the seed-dropping devices. On the rear upper end of the lever is a friction-roller, $l^3$, which engages with the groove in the cam-wheel and actuates the lever as said cam-wheel is rotated.

N is a slide-bar located between the bars $c\ c'$ of the forward frame. Said slide-bar is provided on either end with ordinary seed-cups of any desired form. $n\ n$ are independent springs surrounding the slide-bar. The inner ends of said springs rest against pins $n'$ and detents $n^2$, their outer ends bearing against adjustable blocks O O, secured to the bars $c\ c'$ by pins or bolts $o$, entering the bolt-holes $o'$. By moving the blocks along the bars $c\ c'$ the tension of the springs can be regulated.

P is a reciprocating compressor sliding on the bars $c\ c'$, and held in place by the extension $p$ and strap $p'$, extending under the bar $c$.

Q are slotted sleeves surrounding the slide-bar and secured to the compressor. The outer ends of these sleeves alternately engage with and compress the springs $n\ n$ as the compressor is reciprocated.

$n^2$ are detents on the slide-bar, which engage with spring-catches $n^3$ on the bar $c$ and hold the springs $n\ n$ as they are alternately compressed.

Q' Q' are wedge-shaped tappets provided with slotted extensions $Q^2$, and are secured to the compressor by a bolt, $Q^4$, passing through the slots in the extensions. As the compressor is reciprocated the tappets alternately engage with one of the spring-catches $n^3$ and release the detents $n^2$. The springs $n\ n$, being alternately freed, project the slide-bar first in one and then the other direction, thus quickly opening and closing the valves and dropping the seed in one place. By means of the slotted extensions $Q^2$ and bolt $Q^4$ the tappets can be adjusted to or from the center of the compressor, and thus regulate the stroke of said tappets.

$p^3$ is a bracket secured to the compressor by a bolt, $p^4$, passing through the slot $p^5$, and is adjustable to or from the center of said compressor. The forward end of the lever, passing through the bracket, reciprocates the compressor on the bars $c\ c'$ as the lever is actuated.

R is a gage or register plate secured to the inner side of the frame, and has a register-point, $r$, directly over the center of the shaft I.

R' R' are diametrically-opposite indicator-fingers mounted on the shaft I, and secured thereto by a set-screw. Said fingers are provided with points $r'\ r'$. At the first discharge of seed one of said fingers is set to register with the point $r$, and at each half-revolution of the shaft one of said fingers will register with said point $r$. As the slide-bar will be projected once to the right and left at each revolution of the cam-wheel, and the cam-wheel and indicator being mounted on the same shaft, one of said indicator-fingers, if set to register at the first discharge, will register with the point r at each succeeding discharge, if the planter is working correctly. If at any time the indicator does not register at the moment the discharge takes place, the operator will know that the machine is planting irregularly and is out of check, and by throwing the machine out of gear can set it in check with the next row.

S is a grooved wheel mounted on the shaft I, and secured thereto by a set-screw. A check-row rope can be passed around this wheel, if desired. On one side of said wheel are friction-wheels s s, placed diametrically opposite each other.

S' is a spring-marker pivoted to the center bar, $a^2$, and held down by the spring s'. The forward end of this marker is curved, as shown, and, the friction-wheels engaging with said curved portion as the wheel S revolves, the marker is alternately raised and lowered at each half-revolution of said wheel S. The wheel S, being mounted on the same shaft as the cam K, can be adjusted so that the marker will operate at each half-revolution of said cam and just when the seed is discharged, and thus mark the hills. The friction-wheels being diametrically opposite each other, and the forward part of the marker being curved, one wheel operates to raise the marker immediately after it has been released from the other wheel, thus insuring a prompt and exact marking of the hills and preventing said marker from dragging through the ground.

T is a seat-standard hinged to the center bar, $a^2$. t is a longitudinal slot in said standard.

T' is a brace hinged to the center bar, $a^2$, back of the standard, and is connected to said standard by a bolt, t', passing through the slot t. The seat is thus made adjustable forward or backward.

$T^2$ is the seat, having secured to its under side a semicircular plate, $t^2$, provided with a notched edge, $t^3$. This plate fits in a longitudinal slot, $t^4$, in the top of the standard. The seat is hinged to the standard by a pin, $t^6$, secured in bearings in the top of the standard and passing through a slot, $t^5$, in the plate $t^2$. The notches in the edge of the semicircular plate engage with the lower part of the slot $t^4$ and hold the seat in position, the weight of the driver preventing displacement. When it is desired to have more weight on the forward part of the planter, as when planting in hard ground, the nut of the bolt t' is loosened and the standard inclined to the position shown in dotted lines, Fig. 2. The nut is then tightened, and holds the standard in this position. The slot $t^5$ in the plate $t^2$ is made sufficiently long to allow the notches to be disengaged from the lower part of the slot $t^4$. The seat can be adjusted in the proper plane by raising the same, placing it in the desired plane, and lowering it until the notches $t^3$ engage with the bottom of the slot $t^4$.

I am aware that it is not new to hinge the forward frame carrying the seed-dropping devices to the main frame of the planter. The novelty in this part of my invention consists in hinging said forward frame at its lower part or foot to the main frame, for the purpose described.

Having thus fully described my invention, I claim as new and desire to secure by Letters Patent—

1. In a corn-planter, the combination of a main frame carrying the driving mechanism with a forward frame carrying the seed-dropping devices and hinged at its lower part or foot to the main frame, substantially as and for the purpose shown and described.

2. The combination, in a corn-planter, of a main frame carrying the driving mechanism, a forward frame carrying the seed-dropping devices, and connecting-rods secured to the main frame and hinged to the lower part or foot of the forward frame, substantially as and for the purpose shown and described.

3. The combination, in a corn-planter, of a main frame carrying the driving mechanism, a forward frame carrying the seed-dropping devices, suitable hoppers and dependent seed-tubes secured to said forward frame, and connecting-rods secured to the main frame and hinged to the foot of the seed-tubes, substantially as shown and described.

4. The combination, in a corn-planter, of an operating-lever connected with a reciprocating slide-bar, and actuated by gearing, as shown, and fulcrumed in an adjustable fulcrum-bar secured to the main frame, substantially as described.

5. The combination, in a corn-planter, of a main frame supported upon suitable wheels, a shaft mounted upon the main frame and carrying a cam-wheel, and connected by gearing with the driving-axle, and a lever connected with a reciprocating slide-bar, and having its rear end bent, as shown, and engaging with the cam-wheel, and fulcrumed in an adjustable fulcrum-bar secured to the main frame, all arranged substantially as shown and described.

6. The combination, in a corn-planter, of a main frame supported upon suitable wheels, a shaft mounted upon the main frame and carrying a cam-wheel, and connected by gearing with the driving-axle, a lever connected with a reciprocating slide-bar, and having its rear end bent, as shown, and actuated by the cam-wheel, and fulcrumed in an adjustable fulcrum-bar, and a reciprocating rod mounted in bearings in the main frame, pivoted to and supporting the rear end of the lever, all arranged and operating substantially as shown and described.

7. The combination, in a corn-planter, of a shaft carrying an actuating-cam, a register-plate having a register-point and secured to the main frame, diametrically-opposite register-fingers mounted upon the cam-shaft, and provided with a set-screw, and adapted to register with the point on the register-plate at each half-revolution of the cam-shaft, substantially as and for the purpose set forth.

8. In a corn-planter, the combination, with a reciprocating slide-bar, of independent springs operating alternately to actuate the slide-bar in opposite directions, a reciprocating compressor for compressing the springs, detents and spring-catches for holding the springs after compression, and adjustable releasing-tappets actuated by the compressor, substantially as shown and described.

9. In a corn-planter, the combination, with a slide-bar, of independent springs operating alternately to actuate the slide-bar in opposite directions, a reciprocating compressor for compressing the actuating-springs, a lever actuating the compressor and adjustably secured to said compressor, automatic stops for holding the springs after compression, and adjustable releasing devices actuated by the compressor, for releasing the springs alternately from the stops and causing them to project the slide-bar quickly in opposite directions, all arranged and operating substantially as shown and described.

10. In a corn-planter, the combination of a forward frame, a reciprocating slide-bar, independent springs operating alternately to actuate the slide-bar in opposite directions, adjustable blocks for regulating the tension of the springs, a reciprocating compressor for compressing the actuating-springs, detents and spring-catches for holding the springs after compression, and adjustable releasing-tappets actuated by the compressor for releasing the springs, all arranged and operating substantially as shown and described.

11. The combination, in a corn-planter, of runners secured in front of the seed-tubes, vertical bearings fastened to the front of the seed-tubes, screw-threaded rods mounted in said bearings and having their lower ends bifurcated and adapted to fit over the runners, and provided with gaging-flanges secured to the bifurcated ends of said rod, and nuts for adjusting the rods, whereby the flanges can be raised or lowered, substantially as shown and described.

12. In a corn-planter, the combination of the seed-tube $d$, bearing H, runner $d'$, and pin $g'$ with the screw-threaded and bifurcated rod $g$, provided with the flanges G, substantially as shown and described.

13. In a corn-planter, the seat-standard T, hinged to the main frame and having the slots $t\ t^1$, and the brace T', hinged to the main frame and provided with the adjusting bolt and nut $t'$, in combination with the seat $T^2$, provided with the semicircular plate $t^2$, having a notched edge, $t^3$, and slot $t^5$, and the pin $t^6$, substantially as shown and described.

In testimony whereof I affix my signature in presence of two witnesses.

BY NUNAMACKER.

Witnesses:
J. R. DOUGLASS,
R. EDWARDS.